United States Patent [19]

Schimek

[11] Patent Number: 4,469,192

[45] Date of Patent: Sep. 4, 1984

[54] KEY INTERLOCKED PARKING BRAKE SAFETY ASSEMBLY

[76] Inventor: DuWayne Schimek, 8856 - 134th St. West, Apple Valley, Minn. 55124

[21] Appl. No.: 520,990

[22] Filed: Aug. 8, 1983

[51] Int. Cl.$^3$ ............................................. B60R 25/04
[52] U.S. Cl. ........................................ 180/287; 70/237
[58] Field of Search ................. 180/271, 287; 70/264, 70/239, 255, 237, 252, 389; 200/44; 307/10 AT; 188/265

[56] References Cited

U.S. PATENT DOCUMENTS

| | | | |
|---|---|---|---|
| 3,654,600 | 4/1972 | Yamamoto | 70/252 |
| 3,917,021 | 11/1975 | Williams et al. | 180/271 |
| 4,258,819 | 3/1981 | Baptiste | 180/287 |
| 4,403,675 | 9/1983 | Cardwell | 180/287 |

*Primary Examiner*—Richard A. Bertsch
*Attorney, Agent, or Firm*—Orrin M. Haugen; Thomas J. Nikokai; Douglas L. Tschida

[57] ABSTRACT

A spring-loaded lever assembly for engaging an ignition related cam or slide for preventing the return of a key and ignition to a key release position, without previously setting the parking brake. For dash-mounted ignitions, a cylinder related cam is engaged via a spring-loaded lock lever head and cable actuated lock lever handle. For column ignitions, the cable actuated lock lever handle and head act in concert with a key actuated linear slide. A buzzer and warning light, in turn, warn of the failure to set the parking brake.

7 Claims, 9 Drawing Figures

KEY INTERLOCKED PARKING BRAKE SAFETY ASSEMBLY

BACKGROUND OF THE INVENTION

The present invention relates to automotive key interlock safety assemblies and, in particular, to a parking brake actuated assembly for preventing the ignition from releasing the ignition key without first setting the parking brake.

Manual transmission automobiles have long suffered from the potential threat of vehicle runaway, where upon stopping the vehicle, the operator has failed to engage the parking brake or place the vehicle into a forward or reverse gear. The present invention is, accordingly, directed to alleviating this problem for the majority of possible runaway circumstances, short of the operator leaving the ignition keys in the ignition. Additionally, the present invention in its various embodiments is adaptive to the most typically encountered ignition key configurations; that is, a dash-mounted cylinder/disc assembly and a column-mounted cylinder/slide bar assembly.

Prior to the present invention, a number of ignition key interlocked assemblies have been developed for variously preventing the unintentional locking of an automobile's doors, without first removing the keys; locking the shift column or steering shaft upon removing the key; and turning off the headlights, before removing the key. Example of patents related to such devices can be found upon reference to U.S. Pat. Nos. 2,105,350; 3,708,032; 3,765,262; 3,654,600; 4,232,538; and 4,154,992.

While the above patents relate to key interlocked assemblies, they do not address the problem of preventing inadvertent vehicle runaway or rolling, upon leaving the vehicle. Two attempts at solving this problem, however, can be found upon reference to U.S. Nos. 2,218,730 and 3,917,021. Of these patents, the '730 patent is directed to an ignition assembly having a related manually actuated locking lever such that the drive shaft and rear wheels of a vehicle are locked, upon removing the key from the ignition. Alternatively, the '021 patent relates to a column ignition assembly wherein the key may not be removed until the automatic transmission is placed in park and the key is placed in the "lock" position. However, a rather elaborate, belt-driven assembly is required to perform these functions and which in any case is not convenient for the standard transmission vehicle. It is to be noted, too, that for some makes of modern standard transmission cars, attempts have also been made in the present invention's direction by making it is necessary to place the vehicle in a specific gear (e.g. reverse) before the key can be removed. However, such assemblies fall short of requiring the operator to additionally set the parking brake and which is generally the more positive safety mechanism, should the clutch be worn.

Accordingly, it is a primary object of the present invention to require that the emergency brake be set, before the key can be released from the ignition. In order to accomplish this function, a spring-loaded lever and latch assembly are coupled to the switch block so that the lever will always be spring loaded, to engage a mating notch, and prevent the iginition from being returned to the key "release" position thereby restraining the key, if and when the parking brake is unset. Only upon engaging the parking brake, will the key release.

In one embodiment of the present invention, an assembly of this type is coupled to a dash-mounted key cylinder; and in another embodiment, the assembly is coupled to a column-mounted, lever actuated lock assembly. Also, while the preferred embodiments contemplate simple cable assembly, still other embodiments, contemplate a solenoid actuated assemblies; and all embodiments further contemplate a visual and audible operator warning system.

The above objects, advantages and distinctions of the present invention as well as others, will, however, become more apparent upon referring to the following description of the present invention with respect to the following drawings. Before referring thereto, though, it is to be recognized that the present invention is described principally with respect to its presently preferred embodiment and, accordingly, various modifications may be made thereto by those of skill in the art, without the departing from the spirit and scope of the present invention.

BRIEF DESCRIPTION OF THE DRAWINGS

FIG. 5b shows an alternative, side mounting of the lever for a slide switch of the type in FIG. 5a.

SUMMARY OF THE INVENTION

An emergency brake related interlock assembly for a keyed automotive ignition system, whereby the emergency brake must be set before the ignition key can be removed from the ignition. Particular advantages are obtained thereby in standard transmission vehicles for preventing against vehicle runaway, whether the ignition is dash mounted or column mounted.

As contemplated for a dash-mounted assembly, a notched cam and spring-loaded lever are mounted relative to the keyed cylinder, such that the lever upon turning the key past the "ignition" position engages the notch, and prevents the return of the key to the "release" position, unless the emergency brake is set and which decouples the lever via an interconnecting cable. An associated warning light and buzzer notify the operator of the unset brake condition, should the key be left in the ignition. In lieu of a cable interconnection with the interlock, a switched solenoid operable in response to emergency brake position is contemplated.

Additionally, a spring-loaded interlock assembly is contemplated for use in conjunction with column-mounted ignition assemblies. In that regards, the interlocking lever may operably engage the lever slide assembly along various axes of the ignition terminal block so as to prevent the return of the key to the key release position, unless the emergency brake is set. Again, warning lights and buzzers are contemplated along with the alternative solenoid coupling with the emergency brake in lieu of a cable.

DESCRIPTION OF THE PREFERRED EMBODIMENT

Figure 1:
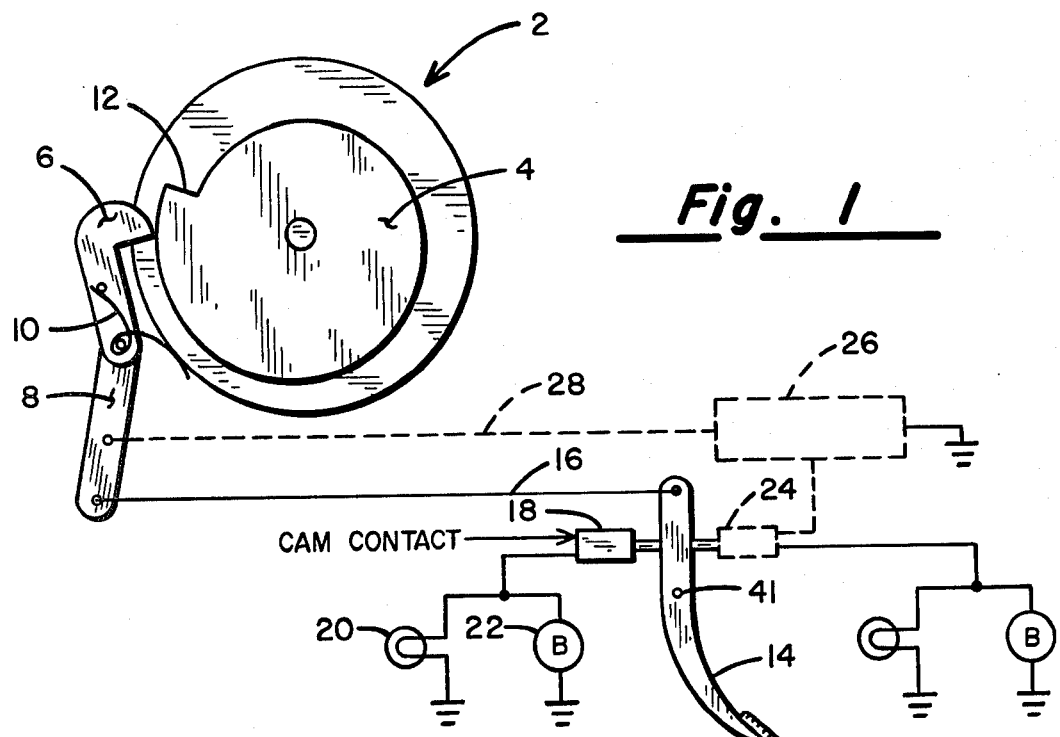
FIG. 1 shows a generalized schematic diagram of the present electro-mechanical interlock assembly relative to a dash-mounted ignition assembly.

Referring to FIG. 1, a generalized system diagram is shown of the present invention relative to an end view of a dash-mounted ignition assembly. Generally, the invention comprises the modification of the keyed ignition assembly 2 to include a notched locking cam 4 that is coupled to a keyed tumbler assembly and that operates in concert with a spring-loaded lock lever head 6, lock lever handle 8 and spring 10 so as to cause the lock lever head 6 to engage the notch 12 in the cam 4 and thereby capture and restrain the cam 4 and prevent the return of the keyed tumbler assembly to the key "release" position, without previously setting the emergency brake. In that regard, the present invention finds particular use in standard transmission vehicles and those vehicles where the transmission is not locked upon removing the key from the ignition. Specifically, the present invention contemplates the coupling of the emergency brake pedal 14 to the lock lever handle 8 via a flexible cable 16, such that upon depressing the emergency brake, the lock lever head 6 is disengaged from the notch 12 so as to permit the returning of the keyed tumbler to the key "release" position and the release of the key.

Additionally, the present invention contemplates the coupling of a normally open contact switch 18 with the emergency brake pedal 14 and lock lever head 6 such that should the lock lever head 6 be engaged with the notch 12, when the parking brake is unset, a dash-mounted warning light 20 and buzzer (B) 22 will warn the operator of the potentially dangerous condition.

Alternatively and shown in phantom line, where a direct cable 16 is not easily adapted to an existing parking brake pedal assembly, in lieu of a cable, the present invention contemplates the use of a second normally open pedal engaging switch 24 that is operably coupled to a solenoid 26, linkage 28 and the lock lever handle 8 such that upon engaging the brake foot pedal 14, the solenoid is actuated so as to retract the plunger and pull off the lock lever head 6. Thus, the switch 24 and solenoid 26 essentially accomplish the same function as the cable 16, although possibly accomodating a wider variety of vehicles, since oftentimes space may be limited. Further, such an assembly minimizes the amount of adjustment which otherwise may be required in certain instances, as where the placement of the emergency brake relative to the iginition 2 does not readily permit the generally straight line of pull that is necessary to deactuate the lock lever head 6. At this point, it should be noted, too, that relative to the mounting of the various switches 18 and 24, solenoid 26 and/or the cable 16 and linkage 28, threadable adjusters may be incorporated into the switches and/or the cable and linkage assemblies so as to permit necessary throw adjustments for a variety of assemblies. Also, adjustable brackets having elongated mounting slots may be used in conjunction with the switches 18 and 24 and solenoid 26 so as to permit necessary adjustment and/or clearance.

Figure 2A:
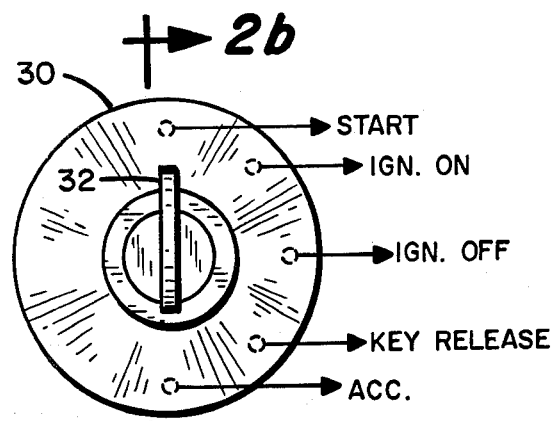
FIG. 2a shows a front view of typical ignition system relative to its various key positions.

Before continuing and in order to better understand the operation of the present interlock assembly, attention is directed to FIG. 2a and which shows the relative key positions for a typical dash-mounted or column-mounted ignition assembly 30 for any typical standard or automatic transmission vehicle. For such assemblies, the key 32 in its rest position, normally aligns with a key "release" position. From this position, the key may then alternatively be turned clockwise to an "accessory" position or alternatively in a counter clockwise direction past an "ignition off" position, and an "ignition on" position to a spring-loaded "start" position. Upon starting the vehicle and releasing the key, the spring loading at the "start" position, causes the ignition assembly to return to the "ignition on" position and which maintains necessary operating power to the coil or electronic ignition. Upon stopping the vehicle, the key is then returned to the key "release" position, where the key may be removed.

The present invention, however, via its above-described interlock assembly, acts to latch the keyed tumbler at the "ignition off" position, before the key can be rotated to the key "release" position. Only upon engaging the emergency brake pedal will the interlocked latch assembly release itself from the ignition assembly so as to permit the key to continue to be turned to the key "release" position and whereat the key may be withdrawn. Thus, with the present assembly, once the ignition has been turned on, and which assumes that driving occurs, the key cannot be removed from the ignition, until the parking brake is set and which avoids against problems of runaway vehicles as with standard or automatic transmission vehicles where the vehicle may accidentally be left in neutral upon removing the key from the ignition. Alternatively, and prior to start up, the present assembly permits the operator to access the accessory position, since the latch assembly is activated only upon passing over the high-point of the cam 4 (i.e. at the "ignition off" position) so as to expose the lock lever head 6 to the notch 12.

Figure 2B:
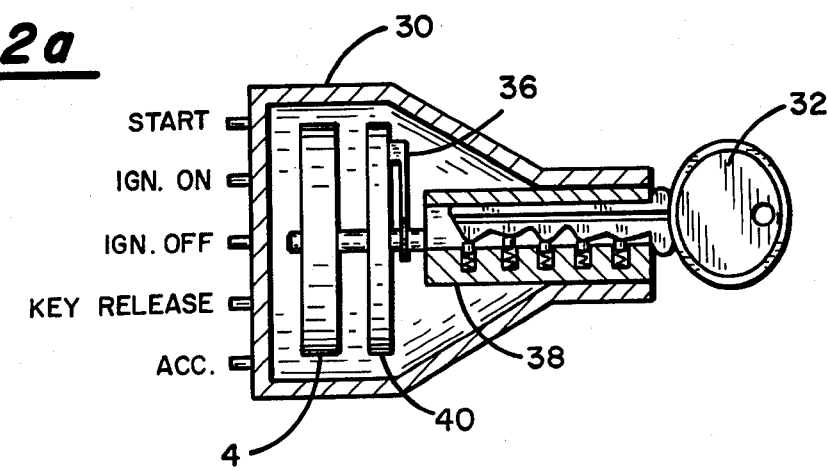
FIG. 2b shows a generalized cross-sectional view taken through a typical dash-mounted keyed ignition assembly.

Attention is also directed to FIG. 2b, wherein a cross section side view of a typical dash-mounted ignition assembly 2 is shown and which is possessed of the above key positions and which operates in the fashion of FIG. 1. Before referring thereto, though, it should be noted that with respect to FIG. 1, an end view is shown and thus the direction of rotation of the key 32 is essentially reversed from the front to the back such that clockwise rotation on the front translates to counterclockwise rotation on the back. Also with respect to FIG. 2b, it is to be noted that the typical tumbler assembly 38 has been modified so as to include the present notched cam 4 and the ignition assembly 30 has been modified to provide for a side opening (not shown) through the tumbler housing and through which the lock lever head 6 and lock lever handle 8 may extend. A side mounted weldment (see FIGS. 3 and 4) is also provided for receiving the axle 37 and about which the lock lever head 6 and lock lever handle 8 rotate.

In FIG. 2b, it is to be noted that the cam is generally mounted at the end of a center mounted shaft 36 that extends from the back of the keyed tumbler assembly 38. Typically, the shaft 36 is fabricated in an octogonal or hexogonal shape, but any other suitable shape suffices so long as it permits the mounting of a mating cam and prevents against the independent rotation thereof as the tumbler 38 is rotated. Mounted between the cam 4 and the tumbler 38, in turn, is a key activated circuit making portion comprising a printed circuit disk and wiper 39 that coact with the tumbler 38 and shaft 36 to make necessary electrical contacts between the various terminal positions, relative to the key travel. Thus, the present cam 4 is easily adapted to pre-existing ignition assemblies, without a great deal of redesign and, may in fact, be added via a conversion kit that replaces the dash-mounted ignition assembly 2.

Figure 3:
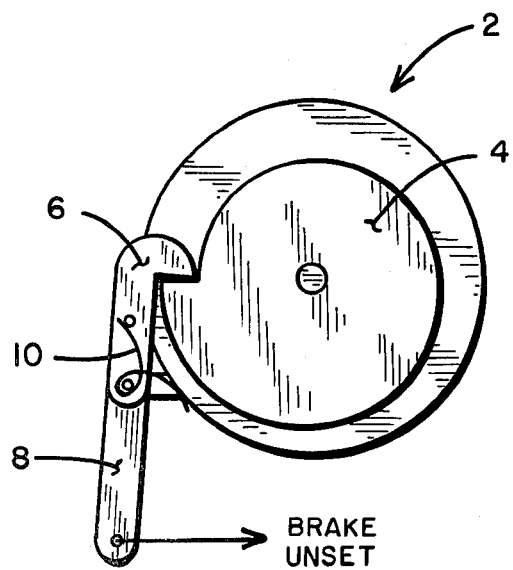
FIG. 3 shows an end view of the present interlock assembly with the emergency brake unset and the interlock latched.

Directing attention now to FIG. 3, and recalling that the lock lever head 6 is spring loaded via the spring 10, FIG. 3 shows a view of the dash-mounted ignition assembly, where the cam 4 has been turned past the notch 12, such that the lock lever head via spring 10 has tripped so as to capture the notch 12. Thus, with the parking brake in the diagrammed unset condition, the lock lever head 6 prevents the further turning of the cam 4 as well as the interconnected tumbler assembly 38. For the present embodiment, as mentioned, such a condition exists when the key 32 is rotated to the "ignition off" position. Therefore, the ignition and engine may be turned off, but the key may not be removed, without setting the parking brake.

Figure 4:
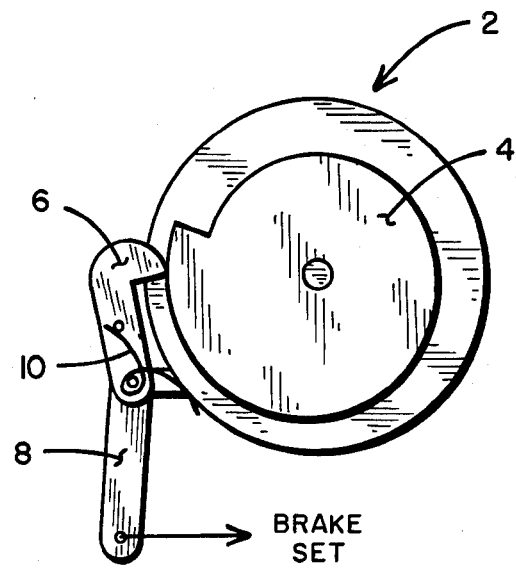
FIG. 4 shows an end view of the present interlock assembly with the emergency brake set and the interlock released.
Figure 6:
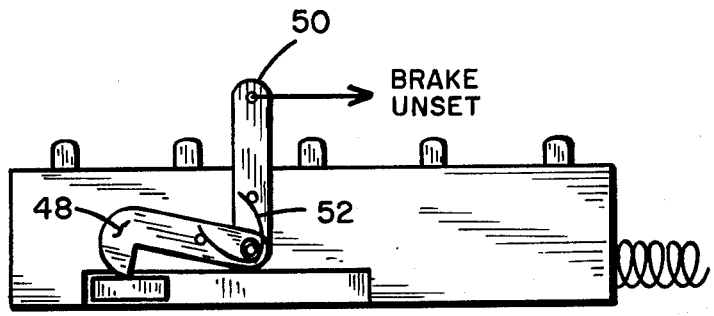
FIG. 6a shows a generalized cross-sectional view of the interlock assembly with the emergency brake unset and the slide lever in the off or accessory position.
Figure 7:
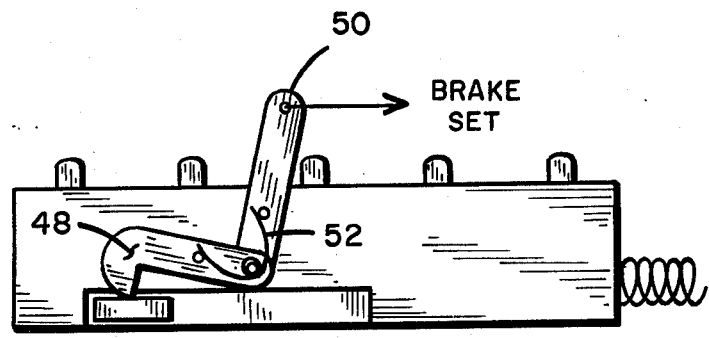
FIG. 7 shows a generalized cross-sectional view of the interlock assembly with the emergency brake set and the interlock assembly unlatched.

Directing attention next to both FIG. 4 and FIG. 1, upon depressing and setting the parking brake 14, the cable linkage 16 is retracted via the pivoting of the parking brake pedal 14 about its pivot 41 and which causes the cable 16 to pull the lock lever handle 8 to the right, thereby releasing the lock lever head 6 from the notch 12. At that point, the key 32 can then be returned to the key "release" position and withdrawn from the ignition. At that point and from FIG. 4, it is to be noted that the lock lever handle 8 is fully extended, but that upon releasing the parking brake and prior to turning the ignition past the off position, the lock lever head 6 and handle 8 would return to the positions shown in FIG. 1. From this position, they would essentially then be rearmed so as to re-engage the notch 12, upon start up. Also, with the brake unset and the key in the key "release" position or for that matter with the brake set and the key in the key "release" position, the ignition may still be turned to its "accessory" position, but which assumes that the operator is in attendance of the vehicle so as to prevent against runaway. The present invention, therefore, is primarily concerned with the other critical condition, where the key 32 is left in the ignition of an unattended vehicle with the parking brake unset.

Again, directing attention to FIG. 1, it is to be recalled that an attendant audible and visual alarm are provided via the warning light 20 and buzzer 22 which coact with the present lock lever head 6 and notch 12 so as to provide appropriate visual and audible warnings to the operator, should the key be returned to the "off" position, without setting the parking brake. For this condition, an electrical connection is made at the point of contact between the lock lever head 6 and the notch 12 and which connection coacts in a logic "or" fashion with the parking brake pedal 14 to advise the operator of the potentially dangerous condition. This condition only occurs for this position, since during normal driving conditions, the lock lever head 12 has fallen over the high point of the cam 4 and rests at the "ignition on" position.

Recognizing that many ignition assemblies 30 are operable in conjunction with the shift or steering column, rather than in a dash mounted fashion, the present invention can further be modified so as to be incorporated into such assemblies and again require the setting of the parking brake before the key can be removed. Such assemblies as previously mentioned relative to the prior art would commonly also provide for the locking of the steering column, upon key removal. For such column-mounted ignition assemblies, the manner and construction of the contact terminal and the linkage to the keyed ignition assembly is, however, slightly different than for the dash-mounted ignition. It that regards, therefore, attention is directed to FIG. 5a and wherein a perspective view is shown of such a typical column-mounted assembly.

Figure 5A:
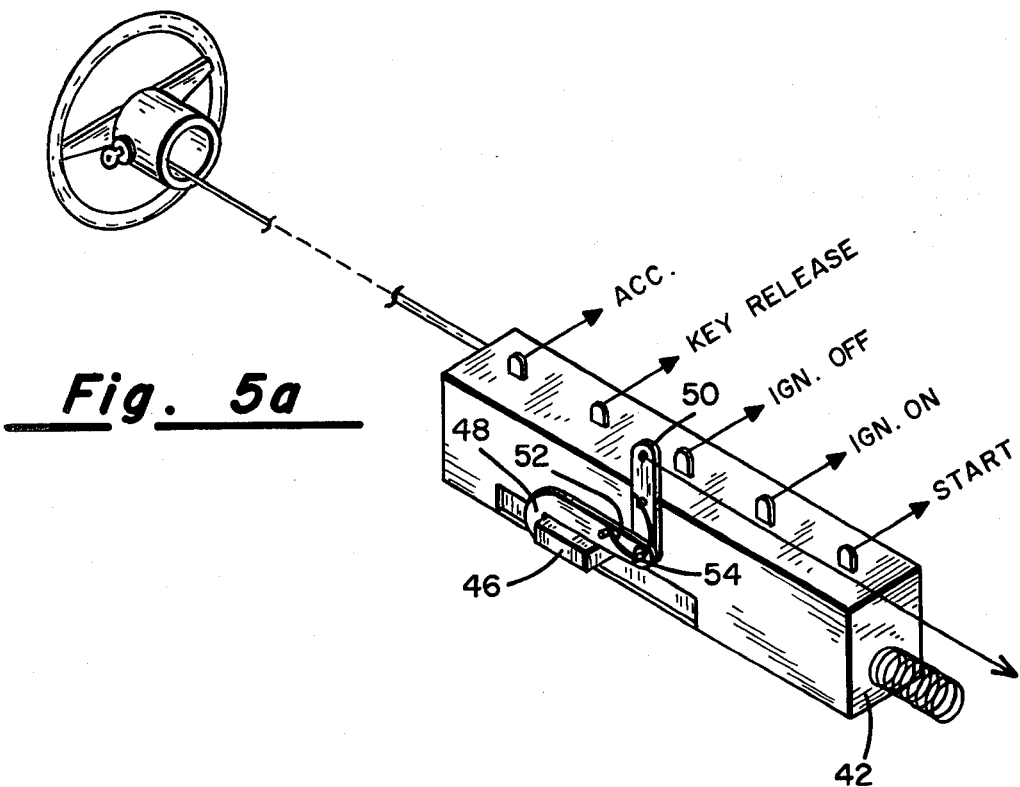
FIG. 5a shows a generalized perspective view of a typical column-mounted ignition assembly.

With reference to FIG. 5a, it is to be noted that while the ignition positions are still essentially the same as those described with respect to FIG. 2a, the various related positions of the keyed ignition switch or circuit making portion 42 are now activated via a linkage or rod assembly 44 that translates the rotational movement of the keyed tumbler into a vertical movement of a lock lever slide 46 at the ignition switch 42. Thus, from FIG. 5a, the uppermost position of the lock lever slide 46 would correspond to the accessory position of the ignition while the lowermost position would correspond to the start position. Accordingly, the lock lever head 48 and lock lever arm 50 have been modified along with the spring 52 and their relative mountings so as to now prevent against the return of the lock lever slide 46 to the key "release" position, prior to releasing the emergency parking brake. The primary difference now is that the lock lever handle 50 is mounted orthogonal to the lock lever head 48 such that the lock lever head 48 rotates about the spring-loaded pivot point 54. Again, though, the general concept is the same, in that upon the lock lever slide 46 (a portion of which extends outwardly from the switch 47) moving transversely past the tip of the lock lever head 48, the lock lever head 48 falls so as to prevent against the returning of the lock lever slide 46 to the key release position, without first setting the parking brake. Upon setting the parking brake via the cable 58, the lock lever head 48 is engaged and tilted up and away from the lock lever slide 46. Also, it should be noted that a spring (not shown) is again provided at the end of the switch assembly 42 so as to engage the lock lever slide 46 in the "start" position and force it back to the "ignition on" position, upon releasing the ignition key.

Figure 5B:
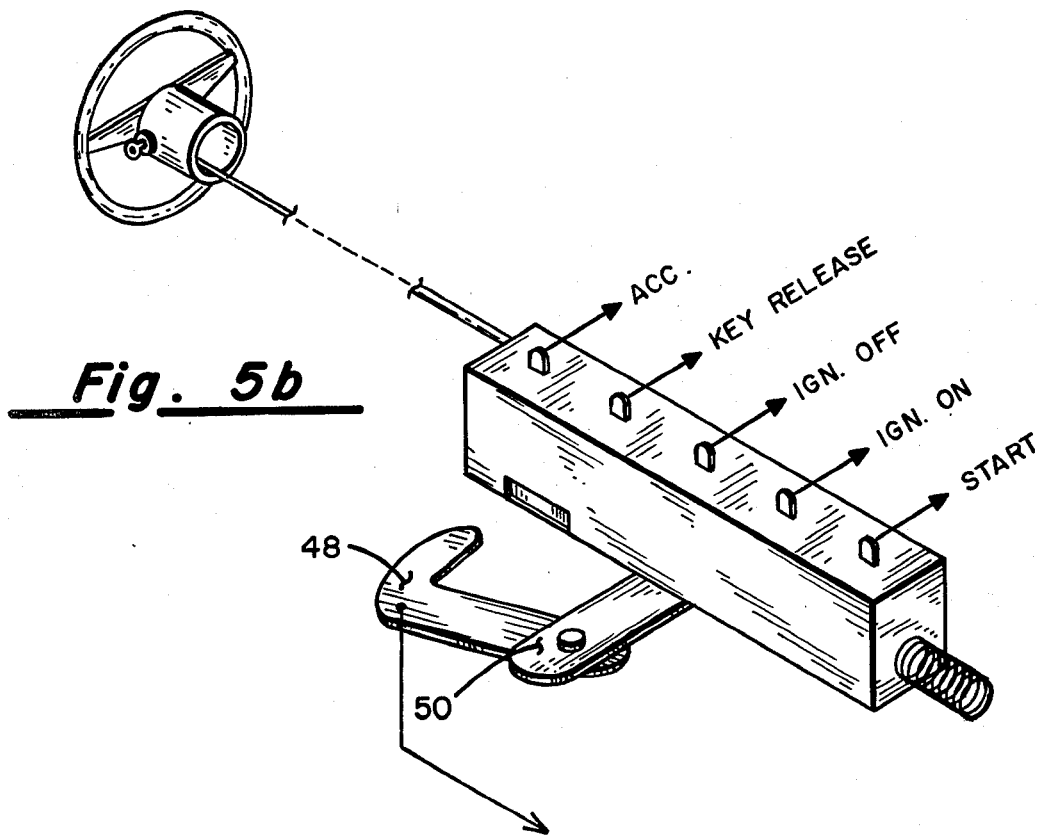

FIG. 5b shows yet another embodiment like FIG. 5a, except now that the lock head 48 is rotated 90° and mounted transversely to the switch 47 so as to extend through the side thereof and engage the lock lever slide 46.

As with FIGS. 3 and 4, FIGS. 6 and 7 now equate with the same conditions, but for a column-mounted ignition terminal assembly 42. That is, with respect to FIG. 6, the brake pedal 14 is unset, and a spring tension is exerted against the lock lever head 48, but which is restrained via the lock lever slide 46. However, upon inserting the key in the ignition and rotating it past the "ignition off" position, the lock lever head 48 drops in the fashion of FIG. 5a so as to prevent the return of the lock lever slide 46. Similarly, where the parking brake 14 is set, the lock lever handle 50 is rotated clockwise about the pivot 54 so as to engage the lock lever head 48 and raise it above the lock lever slide 46. Hence, the key can be returned to the ignition "release" position and withdrawn from the ignition; while the parking brake can subsequently be released and which re-engages the spring tension against the lock lever head 48. Thereafter, upon starting up the ignition, the lock lever head 48 again prevents against the return of the ignition to the key release position.

To those of skill in the art, it should be readily apparent, too, that the column-mounted assembly of FIGS. 5a, 5b, 6 and 7 readily lend themselves to either a cable linkage with the parking brake pedal 14 or with a solenoid linkage, previously described with respect to the dash-mounted ignition in FIG. 1. In summary, therefore, the present invention provides an interlock assembly, whereby key removal is prevented, without the prior setting of an emergency brake. Such an interlock is especially advantageous for a standard transmission vehicle and requires relatively few parts, as contrasted to attempts such as those previously mentioned for U.S. Pat. No. 3,917,021. It should be apparent, too, that while a number of potential modifications have been described with respect to the present invention, still others may suggest themselves to those of skill in the art. Accordingly, it is contemplated that the present invention should be interpreted so as to include all those equivalent embodiments within the spirit and scope of the following claims.

What is claimed is:

1. Apparatus for interlocking a keyed automotive ignition assembly with an associated parking brake assembly, wherein said ignition assembly includes a keyed tumbler coupled to a bidirectionally movable member and said movable member cooperatively engages one or more electrical contacts during the rotation of said key and wherein said key is inserted in and released from said ignition assembly at a key release position, comprising:
   (a) means for restraining the movement of said movable member once said movable member has traversed a predetermined point in a first direction of travel, such that upon being engaged in its opposite direction of travel, said movable member cannot be returned to said key release position; and
   (b) means coupling said restraining means to said parking brake for releasing said restraining means and permitting said movable member to return to said key release position, upon engaging said parking brake, and thereby release said key from said ignition assembly.

2. Apparatus as set forth in claim 1 including means responsive to the oppositely directed engagement of said movable member with said restraining means, whereby an audible warning is provided to the operator relative to a predetermined positional engagement therebetween and terminated upon engaging said parking brake.

3. Apparatus as set forth in claim 1 incuding means responsive to the oppositely directed engagement of said movable member with said restraining means, whereby a visual warning signal is provided to an operator relative to the predetermined positional engagement therebetween and terminated upon engaging said parking brake.

4. An ignition interlock asembly for a dash-mounted keyed ignition having a rotatively mounted keyed tumbler wherein the ignition key may be released therefrom at only one position comprising:
   (a) a cam mounted to said keyed tumbler, such that it rotates therewith;
   (b) spring loaded means for following and restraining said cam, upon the rotation of said tumbler past a predetermined point; and
   (c) means coupling said vehicle's emergency parking brake to said restraining means for decoupling said restraining means, upon the engagement of said emergency parking brake, whereby the ignition key may be returned to the release position only after setting the emergency parking brake.

5. Apparatus as set forth in claim 4 wherein said restraining means comprises:
   (a) a lever arm responsively coupled to said emergency parking brake and pivotally mounted about a pivot point;
   (b) a lever head formed so as to restrainably engage a low point of said cam and operatively coupled to said lever handle at said pivot point for rotating in unison therewith over a predetermined path of travel; and
   (c) a spring coupled about said pivot point and to said lever head and an immobile reference, whereby spring tension is exerted against said lock lever head so as to capture said cam, except when said parking brake is engaged.

6. An ignition interlock assembly for a column-mounted keyed ignition having a rotatively mounted keyed tumbler wherein the ignition key may be released therefrom at only one position and wherein the ignition key interacts with a linearly slidable circuit making element comprising:
   (a) spring loaded means for following and restraining said linearly slidable element, upon the rotation of said tumbler past a predetermined point; and
   (b) means coupling said vehicle's emergency parking brake to said restraining means for decoupling said restraining means, upon the engagement of said emergency parking brake, whereby the ignition key may be returned to the release position only after setting the emergency parking brake.

7. Apparatus as set forth in claim 6 wherein said restraining means comprises:
   (a) a lever arm responsively coupled to said emergency parking brake and pivotally mounted about a pivot point;
   (b) a lever head formed so as to restrainably engage said linearly slidable element and operatively coupled to said lever handle at said pivot point for rotating in unison therewith over a predetermined path of travel; and
   (c) a spring coupled about said pivot point and to said lever head and an immobile reference, whereby spring tension is exerted against said lever head so as to capture said linearly slidable element, except for when said parking brake is engaged.

* * * * *